Oct. 2, 1928.
R. E. MESSLER ET AL
1,686,335
INTERIOR TANK CAR CLEANER
Filed June 9, 1927
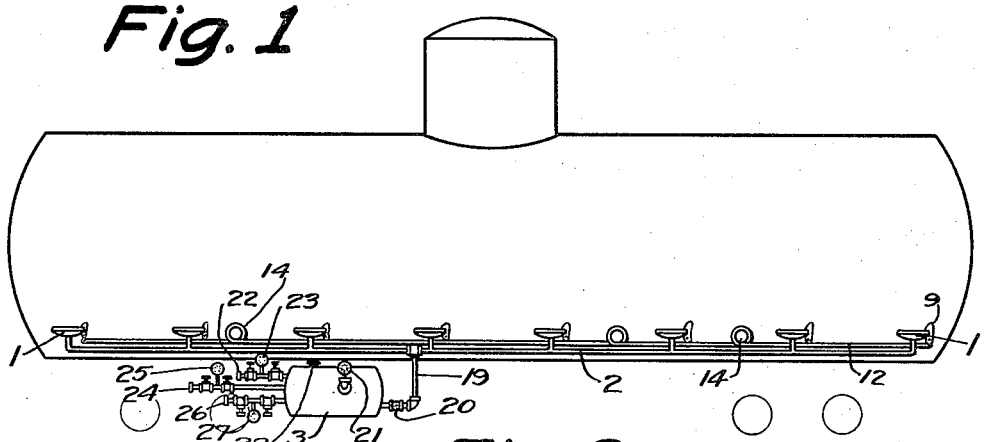
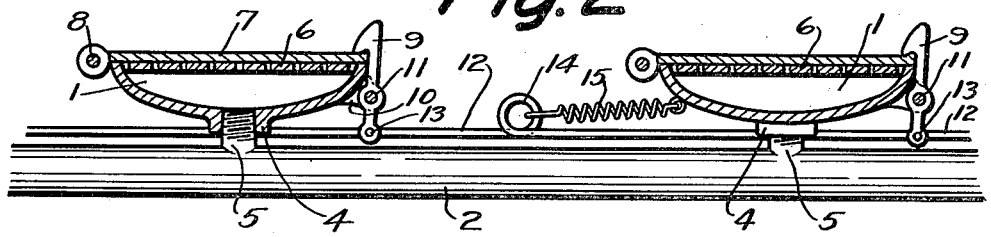
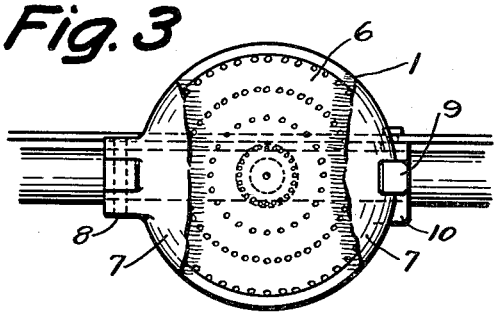
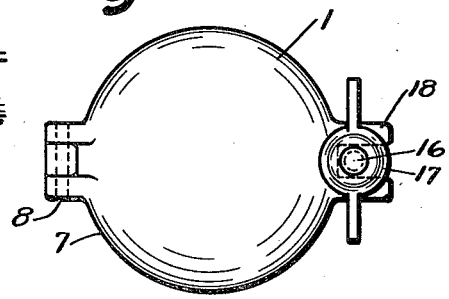
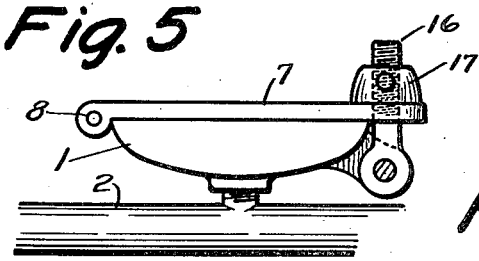
Inventor
Raymond E. Messler
Fred A. Ivory
By Harry Bowen
Attorney Patented Oct. 2, 1928.

1,686,335

UNITED STATES PATENT OFFICE.

RAYMOND E. MESSLER AND FRED A. IVORY, OF SEATTLE, WASHINGTON.

INTERIOR TANK-CAR CLEANER.

Application filed June 9, 1927. Serial No. 197,558.

The invention is an apparatus for cleaning tank cars which is permanently installed and readily operated.

The object of the invention is to provide means for readily cleaning tank cars.

Another object of the invention is to provide an apparatus that may readily be placed in a car and connected to a mixing chamber on the outside where fluids may be mixed under pressure and discharged into the cleaning apparatus.

Another object of the invention is to provide a device that may be installed on the interior of a tank car which may readily discharge a spray over the entire interior of the car.

A further object of the invention is to provide an apparatus that may be installed on the interior of tank cars which may discharge a plurality of sprays and in which the spraying devices may readily be sealed when not in use.

A still further object of the invention is to provide means for unsealing and releasing the spraying devices from a remote point.

And a still further object of the invention is to provide a spraying device for cleaning tank cars which is of a simple and economical construction.

With these ends in view the invention embodies a plurality of spray nozzles with means for sealing them and also means for releasing the sealing means, a common feeder for the nozzles, and a mixing chamber through which the prepared mixture is supplied to the feeder line.

Other features and advantages of the invention will appear from the following description taken in connection with the drawings, wherein:

Figure 1 is a view showing an outline of a tank car with the device in place.

Figure 2 is a view showing a cross section through the spraying devices.

Figure 3 is a plan view with part broken away showing one of the spraying devices.

Figure 4 is a similar view showing an alternate means for clamping the cover of the spraying device.

Figure 5 is a side view of the device shown in Figure 4.

In the drawings the device is shown as it would be made wherein numeral 1 indicates the spraying devices, numeral 2 the feeder line, and numeral 3 the mixing tank.

The spraying device 1 is made as shown in Figure 2 with a hub 4 at the bottom by which it is connected to the feeder line 2 through a nipple 5. The upper part of the device 1 is made with a perforated plate 6 and it will be observed that as a fluid passes from the pipe 2 into the devices 1 it will be forced through the perforations, thereby forming a spray. The device 1 is provided with a cover 7 that is attached to it by a hinge 8 and held in the downward position by a latch 9 which is pivotally attached to a lug 10 by a pin 11. The lower end of the latch 9 is pivotally attached to a bar 12 through a pin 13 and it will be observed that as the bar 12 is moved in one direction it will move the upper end of the latch to release the cover plate 7, whereas, if it is moved in the opposite direction it will clamp the plate.

It will be observed that the edge of the cover is provided with a slight raise and the under side of the latch is beveled so that as the latch is forced into place it will positively clamp the cover against the perforated plate and thereby seal the openings.

The bar 12 may be provided with a plurality of loops or rings 14 by which it may be gripped by a rod or hook from the manhole of the tank car so that the cover plates may be released without entering the car. It will be observed that a spring 15 may be used if desired to hold the bar in the position shown with the latches closed.

It will also be observed that the latch may be replaced by a screw 16 having a nut 17 on it which may extend between projections on the cover 18 to clamp the cover in the closed position if desired. With this arrangement it will be necessary for the operator to go into the car to release the cover plates.

The tank 3 may be of any suitable size or design and may be located at any suitable point. In the design shown it is arranged below and to one side on the car and it will be noted that it is connected to the feeder 2 by a pipe 19 which has a valve 20 in it. The tank is provided with a temperature gauge 21, as shown. The tank is also provided with an air inlet as indicated by the numeral 22 and this connection is provided with a gauge 23 having valves on each side of it. A steam connection 24 is also provided which has a gauge 25 in it and this is also provided with valves on each side of the gauge. The tank is also provided with a water connection 26 which also has a gauge 27 with valves on each side. It will therefore be observed that any desired mixture of air, steam, and water may be injected into the tank at any desired pressure. An opening 28 is provided at the top of the tank which may be formed with a nipple having a cap on, it so that chemicals or any solution or fluid may be placed in the tank.

It will be understood that changes may be made in the construction without departing from the spirit of the invention.

The construction will be readily understood from the foregoing description. To use the device, the feeder pipe 2 with the nozzles may readily be installed in a tank car with a mixing tank 3 on the outside and it will be observed that as a fluid under pressure is admitted from the tank 3 to the spray nozzles with the closures released the closures will immediately open and the fluid will be sprayed over the entire interior of the car. This will therefore provide a very efficient device for thoroughly spraying the interior of the tank car with a fluid of any suitable mixture and under any suitable pressure.

Having thus fully described the invention what we claim as new and desire to secure by Letters Patent is:

1. In an apparatus for cleaning tanks, a plurality of spray devices connected to a common header arranged in the bottom of the tank, an auxiliary chamber mounted on the tank, separate connections for supplying air, water and steam to the auxiliary chamber under pressure, each of said connections being provided with a pressure recording gauge, said auxiliary chamber being provided with an opening through which any cleaning compound may be placed therein, and a connection from the auxiliary chamber to the header in the bottom of the tank.

2. In an apparatus for cleaning tanks, a plurality of spray devices connected to a common header arranged in the bottom of the tank, suitable closures for the said spraying devices, an auxiliary chamber mounted on the tank, separate connections for supplying air, water, and steam to the auxiliary chamber under pressure, each of said connections being provided with a pressure recording gauge, said auxiliary chamber being provided with an opening through which any cleaning compound may be placed therein, and a connection from the auxiliary chamber to the header in the bottom of the tank.

3. In an apparatus for cleaning tanks, a plurality of spray devices connected to a common header arranged in the bottom of the tank, suitable closures for the said spraying devices, means for clamping the said closures to seal the said spraying devices, an auxiliary chamber mounted on the tank, separate connections for supplying air, water and steam to the auxiliary chamber under pressure, each of said connections being provided with a pressure recording gauge, said auxiliary chamber being provided with an opening through which any cleaning compound may be placed therein, and a connection from the auxiliary chamber to the header in the bottom of the tank.

4. In an apparatus for cleaning tanks, a plurality of spray devices connected to a common header arranged in the bottom of the tank, suitable closures for the said spraying devices, means for clamping the said closures to seal the said spraying devices, means for releasing the said closures from a remote point, an auxiliary chamber mounted on the tank, separate connections for supplying air, water and steam to the auxiliary chamber under pressure, each of said connections being provided with a pressure recording gauge, said auxiliary chamber being provided with an opening through which any cleaning compound may be placed therein, and a connection from the auxiliary chamber to the header in the bottom of the tank.

5. An apparatus for cleaning tanks comprising a plurality of spray devices connected to a common header in the tank, an auxiliary chamber connected to the said header, means for supplying air, water and steam to the auxiliary chamber, and an opening through which a cleaning compound may be placed in the said auxiliary chamber.

6. In an apparatus for cleaning tanks of tank cars, a plurality of spray devices connected to a common header arranged in the bottom of the tank, an auxiliary chamber mounted on the tank, separate connections for supplying air, water and steam to the auxiliary chamber under pressure, said auxiliary chamber being provided with an opening through which any cleaning compound may be placed therein, and a connection from the auxiliary chamber to the header in the bottom of the tank.

7. In an apparatus for cleaning tanks of tank cars, a plurality of spray devices, permanently positioned within the said tank, suitable closures for sealing the said spraying devices, and means for supplying different solutions to the said spray devices.

In testimony whereof we affix our signatures.

RAYMOND E. MESSLER.
FRED A. IVORY.